(12) United States Patent
Sheridan

(10) Patent No.: US 6,457,590 B1
(45) Date of Patent: Oct. 1, 2002

(54) STRAINER FOR STOCK POTS

(76) Inventor: John Sheridan, 1406 N. 85th Pl. Apt. 210, Scottsdale, AZ (US) 85257

(*) Notice: Subject to any disclaimer, the term of this patent is extended or adjusted under 35 U.S.C. 154(b) by 0 days.

(21) Appl. No.: 10/079,689

(22) Filed: Feb. 20, 2002

(51) Int. Cl.⁷ .............................. A23L 1/00; A47J 43/28; B65D 51/16
(52) U.S. Cl. ........................... 210/469; 99/495; 99/413; 210/464
(58) Field of Search ............................ 99/403, 410, 411, 99/413, 414, 495, 496, 497, 510; 126/369, 383.1; 210/464, 467, 469; 215/390, 387, 386, 396; 220/578, 370, 703, 731, 710.5, 573.1, 212.5; 222/189.07, 566; 294/9, 32; 248/224.7, 214; 24/563, 562, 545, 3.1; D7/667, 396.2

(56) References Cited

U.S. PATENT DOCUMENTS

| | | |
|---|---|---|
| 163,659 A | 5/1875 | Hoyt |
| 844,906 A * | 2/1907 | Adams ...................... 222/566 |
| 1,177,205 A | 3/1916 | Mullin |
| 2,106,453 A | 1/1938 | Ekdahl |
| 2,357,063 A | 4/1944 | Swing |
| 2,744,631 A * | 5/1956 | Toombs ................... 215/386 X |
| 2,766,889 A * | 10/1956 | Rey .......................... 210/469 |
| 3,865,023 A * | 2/1975 | Halvorsen .................... 99/495 |
| 4,020,532 A * | 5/1977 | Lichter .......................... 24/562 |
| 4,389,926 A * | 6/1983 | Joyner ......................... 99/495 |
| 4,934,420 A * | 6/1990 | Radna ..................... 99/495 X |
| 4,942,811 A * | 7/1990 | Kuhn ........................... 99/495 |
| 5,084,177 A * | 1/1992 | Keene ..................... 99/495 X |
| 5,297,476 A * | 3/1994 | Garland et al. ................ 99/495 |
| 5,526,737 A * | 6/1996 | Betzen ..................... 99/496 X |
| 5,653,881 A | 8/1997 | Bruss et al. |
| 5,701,810 A * | 12/1997 | Nakai .......................... 99/495 |
| 5,913,966 A | 6/1999 | Arone et al. |
| 6,056,146 A | 5/2000 | Varakain et al. |
| 6,068,314 A | 5/2000 | Dorazio et al. |
| 6,247,212 B1 * | 6/2001 | Grana Iglesias ............. 24/563 |

* cited by examiner

Primary Examiner—Timothy F. Simone
(74) Attorney, Agent, or Firm—Frank J. McGue

(57) ABSTRACT

A stock pot strainer is adapted for use in separating the liquids from the solids in a large stock pot. The stock pot strainer comprises an elongated, inverted U-shaped member having a base, an exterior arm and an interior arm. The elongated, U-shaped member is adapted to slide over a sidewall of a stock pot with said sidewall being captured between the interior arm and the exterior arm. The distal end of the exterior arm has a handle mounted thereon while the distal end of the interior arm has a grip mounted thereon. The grip is adapted to frictionally engage an interior sidewall of a stock pot. A strainer element extends laterally from the interior arm in a direction opposite the exterior arm at a position proximate to the base. The strainer element is adapted to retain solids within a stock pot and allow the liquids to drain therefrom.

10 Claims, 2 Drawing Sheets

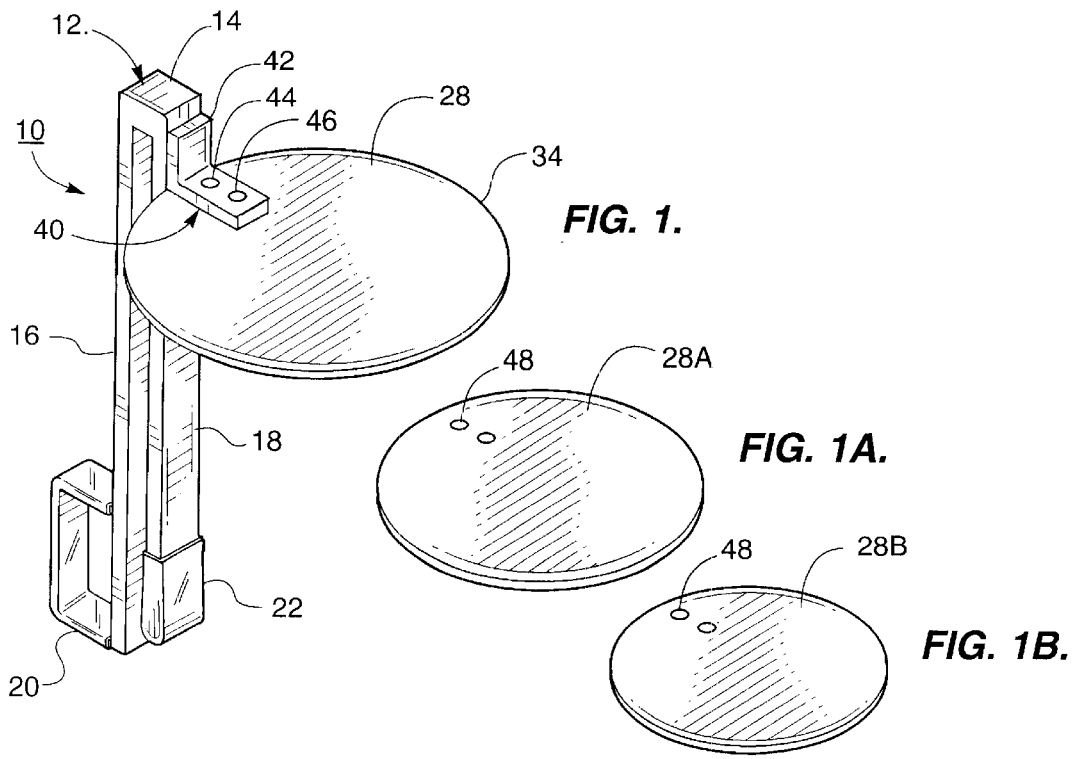
FIG. 1.
FIG. 1A.
FIG. 1B.
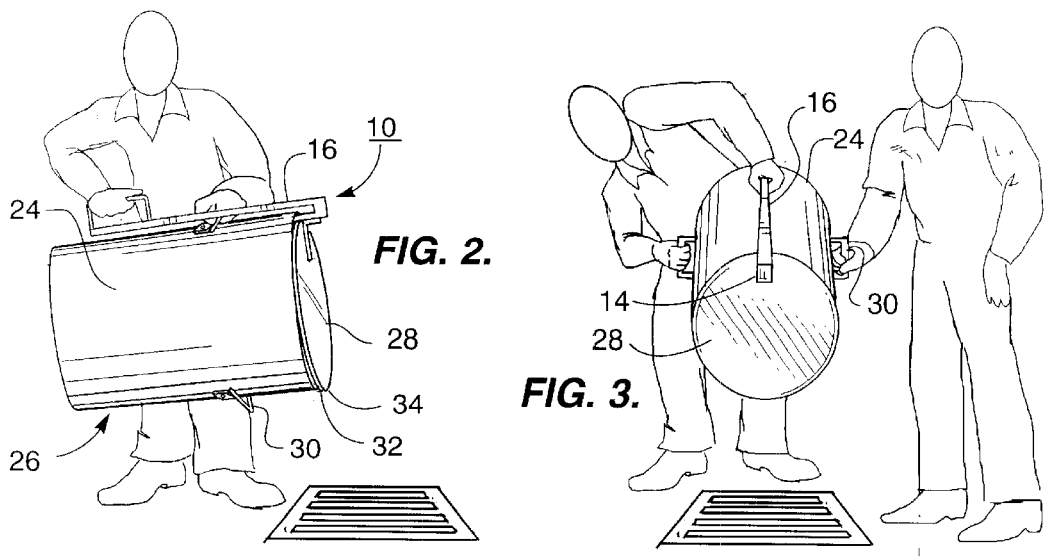
FIG. 2.
FIG. 3.

STRAINER FOR STOCK POTS

TECHNICAL FIELD

This invention relates generally to the field of strainers, and, more particularly, to a strainer for large stock pots.

BACKGROUND OF THE INVENTION

Stock pots are generally large cooking vessels into which vegetables, meats, fish and virtually any other food items are place with liquids including water or wine for cooking of same. After steeping in the broth, it is often desired to separate out the solids from the cooking broth.

In the typical kitchen, this is easily accomplished by pouring the stock pot contents through a strainer. However, in the restaurant or catering business, the size of the stock pot makes this a difficult or, considering the dangers of scalding, even dangerous task for a single individual. Thus, there is a need for using a strainer which is safe and adapted for use by a single user if needed.

There are a variety of strainer or similar devices described in the art.

U.S. Pat. No. 2,357,063 entitled "Ice-Guard" which issued on Aug. 29, 1944 to Swing discloses an ice guard device which comprises a strainer extending over the opening of a cup and supported by a resilient clip holder engaging the side of the cup.

U.S. Pat. No. 2,106,453 entitled "Portable Strainer for Insertion in the Mouths of Liquid Containers" which issued on Jan. 25, 1938 to Ekdahl shows an ice guard device which comprises a strainer extending over the opening of a cup and supported by a resilient clip holder engaging the side of the cup.

None of the known prior art disclose the combination set forth herein.

SUMMARY OF THE INVENTION

It is an object of this invention to provide an improved stock pot strainer for use with large volume stock pots operable by a single user.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a perspective view of one embodiment of the present invention;

FIGS. 1A and 1B are perspective views of interchangeable strainer elements suitable for use with the embodiment of FIG. 1;

FIG. 2 is a side view of the invention in use with a stock pot;

FIG. 3 is a front view of the invention in use with a stock pot;

DESCRIPTION OF THE PREFERRED EMBODIMENT

Figure 4:
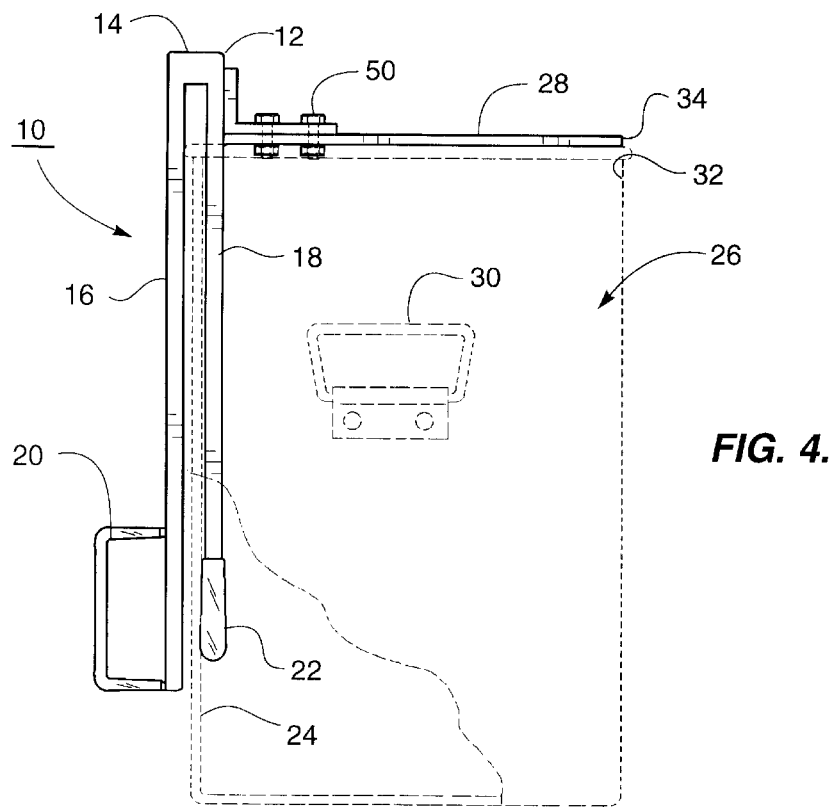
FIG. 4 is a cross sectional side view of the invention engaged with a stock pot.

Referring more particularly to the drawings by characters of reference, FIGS. 1–5 disclose combinations of features which constitute the components of a stock pot strainer 10 of the present invention. In the presently preferred embodiment, stock pot strainer 10 comprises an elongated, inverted U-shaped member 12 having a base 14, an exterior arm 16 and an interior arm 18. The distal end of exterior arm 16 has a handle 20 mounted thereon. The distal end of interior arm 18 has a grip 22 mounted thereon which is adapted to frictionally engage a sidewall 24 of a stock pot 26. A strainer element 28 extends laterally from interior arm 18 in a direction opposite exterior arm 16 at a position proximate to base 14.

In use, inverted U-shaped member 12 is adapted to slide over sidewall 24 of stock pot 26 with base 14 atop sidewall 24. Interior arm 18 extends inside stock pot 26 and exterior arm extends outside of stockpot 26 with sidewall 24 captured therebetween.

Handle 20 on exterior arm 16, in combination with a stock pot handle 30 (most stock pots 26 have two handles 30 mounted on opposing sides of stock pot 26), provide leverage points for a single user to lift stock pot 26. Grip 22 on interior arm 18 frictionally engages sidewall 24 to prevent same from disengaging therefrom.

Strainer element 28 is sized to substantially cover an open end 32 of stock pot 26 whereby, once stock pot 26 is lifted as shown in FIGS. 2 and 3, stock pot 26 contents are poured around strainer element 28 thereby retaining the solid elements within stock pot 26 while the liquid broth is dispensed between the edge 34 of strainer element 28 and the sidewall 24 of stock pot 26.

Figure 5:
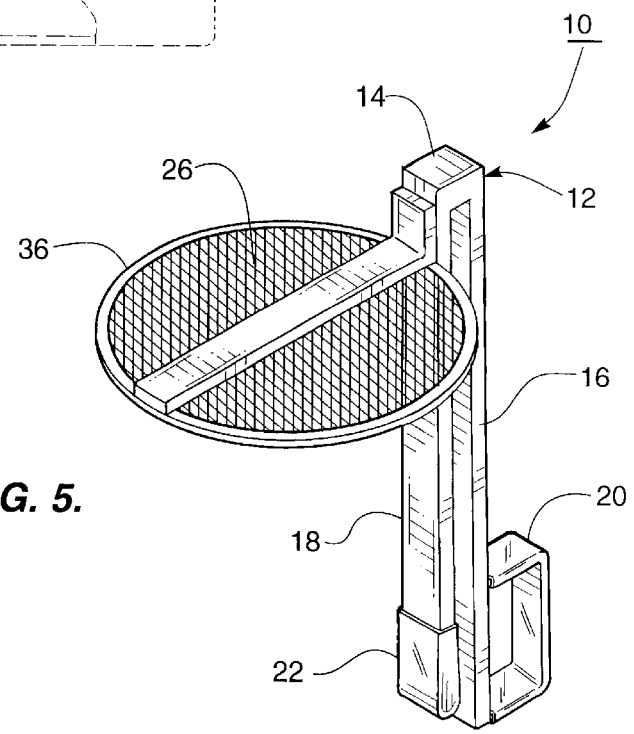
FIG. 5 is a perspective view of an alternate embodiment of the invention.

In an alternate embodiment of strainer element 28 shown in FIG. 5, strainer element 28 comprises a mesh screen 36 thereby allowing the liquid broth to be dispensed through said mesh screen 36 rather than the edges of strainer element 28. In addition, for larger sizes, a reinforcing bar 38 extending across the diameter of strainer element 28 from interior arm 18 may be added to provide structural support for strainer element 28 to avoid bending thereof.

In the embodiments shown in FIGS. 1, 1A and 1B, interchangeable strainer elements 28, 28A and 28B are adapted to mount to strainer 10 to allow for use with differing size stock pots 26. In the illustrated embodiment, an L-shaped bracket 40 is provided with a vertical leg 42 mounted on interior arm 18 and a horizontal leg 44 extending partially across strainer element 28. Two bolt holes 46 on horizontal leg 444 are adapted to align with corresponding bolt holes 48 on strainer element 28. A nut and bolt combination 50 holds strainer element 28 to leg 44 as best seen in FIG. 4. The use of nut and bolt combination 50 allows a user to switch between differing sizes of strainer elements 28, 28A and 28B as desired. Those skilled in the art will recognize that many other options exist for releasably mounting strainer element 28 to device 10 and that the illustrated embodiment is presented solely for exemplary purposes.

Device 10 allows a single user to dispense broth while minimizing the risk of burns. In addition, for heavier loads, placement of device 10 between two stockpot handles 30 allows two users to employ same as shown in FIG. 3.

Although only certain embodiments have been illustrated and described, it will be apparent to those skilled in the art that various changes and modifications may be made therein without departing from the spirit of the invention or from the scope of the appended claims.

What is claimed is:

1. A stock pot strainer adapted for use in separating the liquids from the solids in a large stock pot, the stock pot strainer comprising:

an elongated, inverted U-shaped member having a base, an exterior arm and an interior arm, the elongated, U-shaped member being adapted to slide over a sidewall of a stock pot with said sidewall being captured between the interior arm and the exterior arm, the distal end of the exterior arm having a handle mounted thereon, the distal end of the interior arm having a grip mounted thereon, the grip being adapted to frictionally engage an interior sidewall of a stock pot, a strainer element extends laterally from the interior arm in a direction opposite the exterior arm at a position proximate to the base, the strainer element adapted to retain solids within a stock pot and allow the liquids to drain therefrom.

2. The stock pot strainer of claim 1 wherein the strainer element is sized to substantially cover an open end of a stock pot whereby liquid pours around the strainer element.

3. The stock pot strainer of claim 1 wherein the strainer element comprises a mesh screen sized to substantially cover the open end of a stock pot whereby liquid pours through the strainer element.

4. The stock pot strainer of claim 1 further comprising a reinforcing bar extending across the diameter of the strainer element from the interior arm to provide structural support for the strainer element.

5. The stock pot strainer of claim 1 wherein the strainer element is adapted to be releasably mounted to the interior arm.

6. The stock pot strainer of claim 5 further comprising an L-shaped bracket having a vertical leg mounted to the interior leg and a horizontal leg extending partially across the strainer element, the strainer element being releasably mounted to the horizontal leg.

7. The stock pot strainer of claim 1 wherein the strainer element comprises a plurality of interchangeable strainer elements, each of the interchangeable strainer elements adapted to be releasably mounted to the interior arm.

8. A stock pot strainer adapted for use in separating the liquids from the solids in a large stock pot, the stock pot strainer comprising:

an elongated, inverted U-shaped member having a base, an exterior arm and an interior arm, the elongated, U-shaped member being adapted to slide over a sidewall of a stock pot with said sidewall being captured between the interior arm and the exterior arm, the distal end of the exterior arm having a handle mounted thereon, the distal end of the interior arm having a grip mounted thereon, the grip being adapted to frictionally engage an interior sidewall of a stock pot, a strainer element extending laterally from the interior arm in a direction opposite the exterior arm at a position proximate to the base, the strainer element adapted to retain solids within a stock pot and allow the liquids to drain therefrom, the strainer element comprising a plurality of interchangeable strainer elements, each of the interchangeable strainer elements adapted to be releasably mounted to the interior arm, a reinforcing bar extending across the diameter of the strainer element from the interior arm to provide structural support for the strainer element.

9. The stock pot strainer of claim 1 wherein the strainer element is sized to substantially cover an open end of a stock pot whereby liquid pours around the strainer element.

10. The stock pot strainer of claim 1 wherein the strainer element comprises a mesh screen sized to substantially cover the open end of a stock pot whereby liquid pours through the strainer element.

* * * * *